United States Patent

[11] 3,599,222

[72] Inventors David M. Franklin
Lexington;
Clive L. Nickerson, Ashland, both of, Mass.
[21] Appl. No. 37,644
[22] Filed May 15, 1970
[45] Patented Aug. 10, 1971
[73] Assignee The United States of America as represented by the Secretary of the Army

[54] VELOCITY SHOCK RECORDER
4 Claims, 2 Drawing Figs.
[52] U.S. Cl............................................. 346/7,
346/74 M, 346/136, 73/517
[51] Int. Cl......................................G01p 15/08,
G11b 5/00
[50] Field of Search............................ 346/7, 33
M, 74 M, 136; 73/489, 517

[56] References Cited
UNITED STATES PATENTS
2,695,211 11/1954 Guttwein et al. ............. 346/7
3,059,235 10/1962 Sammis et al. ................ 346/7
3,167,777 1/1965 Zagorites et al. ............. 346/74 M Primary Examiner—Joseph W. Hartary
Attorneys—Harry M. Saragovitz, Edward J. Kelly and Herbert Berl ABSTRACT: A velocity shock recorder is described which is capable of measuring and recording shock environments, in terms of impact velocity or drop height, to which containers are subjected to in shipment, handling and storage. A basic magnetic tape recorder is employed within the container wherein are affixed to the inside walls thereof electromagnetic transducers coupled to the magnetic recording heads of said recorder. At impact a voltage proportional to the impact velocity is generated by a related electromagnetic transducer and is coupled to a magnetic recording head which in response thereto causes a signal to be recorded on the tape while it is stationary. This generated voltage is also coupled to a transistor actuating circuit which in response thereto causes a series of transistor switches to be biased into conduction whereupon a path is provided for a capacitor power supply to discharge through the stepping motor of said recorder whereby the magnetic tape is advanced and whereby through such action a negative voltage step is obtained. A transistor switch means is set into operation in response to the negative step voltage associated with operation of the stepping motor and functions to cutoff the aforementioned voltage on the initial positive cycle at a value slightly beyond the maximum value and also prevents activation of the magnetic recording heads by secondary signals for a period of two seconds.

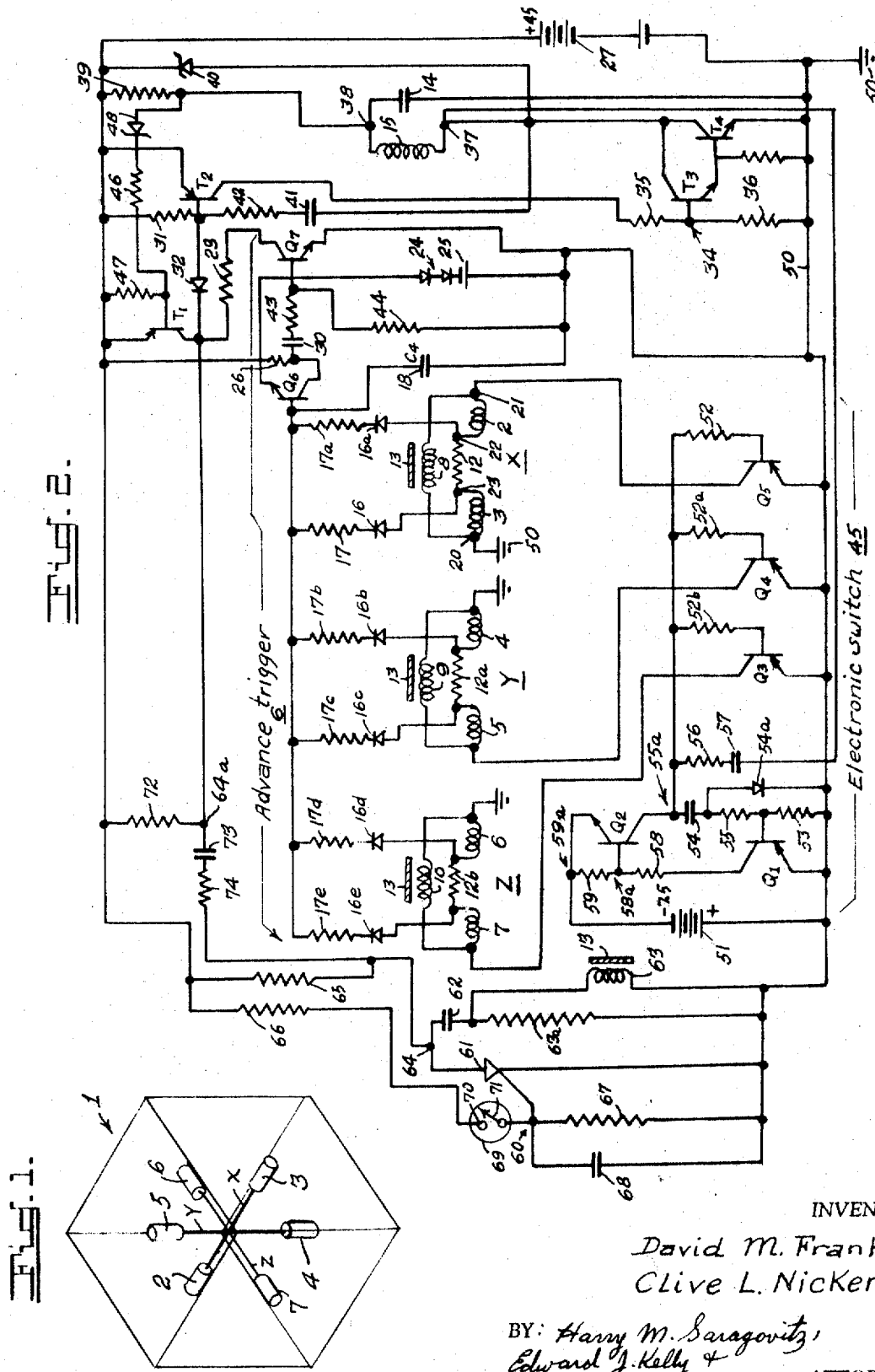

3,599,222

VELOCITY SHOCK RECORDER

The invention described herein may be manufactured, used, and licensed by or for the Government for governmental purposes without the payment to us of any royalty thereon.

This invention relates to velocity shock recorders capable of measuring and recording the shock environment in terms of impact velocity to which shipping containers are subjected to in shipment, handling and storage.

In many commercially available shock recorders data recorded by marks must be visually measured and manually recorded to obtain desired information. This not only is time consuming but also susceptible to human error. In any large scale study involving the measurement of shipping conditions over numerous supply routes and extended periods of time, the volume of data generated would create a serious processing problem when the aforementioned type of recorders are employed. However, magnetic tape recordings can be played back through analog-to-digital converters and the desired information can be printed rapidly and automatically on paper tape.

Accordingly, it is a prime object of the invention to provide a solid-state velocity shock recording unit including velocity shock transducers wherein the recording is made when the magnetic tape is not in motion and which generally consists of a spring loaded magnetic tape supply with takeup reels, recording heads mounted in line for recording four channels on said tape, a rotary stepping motor to advance the tape one-sixteenth in. for each shock input, solid-state circuitry to provide electrical triggering for advancing the stepping motor and electronic switch circuitry for elimination of undesirable secondary signal inputs produced by the transducers.

The novel features which are considered characteristic of the invention are set forth with particularity in the appended claims. The invention itself, however, both as to its organization and method of operation as well as additional objects and advantages thereof, will be best understood from the following description taken in conjunction with the accompanying drawings, in the several figures of which:

FIG. 1 is a schematic diagram showing an arrangement wherein electromagnetic velocity transducers are positioned within the container on the impact surfaces thereof along the X, Y and Z axes.

FIG. 2 is a schematic diagram of the velocity shock recorder of the invention.

In FIG. 1 there is shown a preferred arrangement of velocity transducers in a container 1 for obtaining data on the affects of impact to which the various walls of the container are subjected to during shipment and handling. Along the X axis of the container a velocity transducer 2 is affixed to a wall and a velocity transducer 3 is affixed to an opposite wall. Similarly, along the Y axis velocity transducers 4 and 5 are positioned adjacent to opposite walls and along the Z axis, velocity transducers 6 and 7 now positioned adjacent to opposite walls. Such velocity transducers are preferably electromagnetic velocity transducers as disclosed in Pat. application, Ser. No. 699,216 now, Pat. No. 3,483,759.

Referring to FIG. 2, X, Y, and Z generally indicate the recording channels with reference to the X, Y and z axes of the container as generally illustrated in FIG. 1. The magnetic recording heads of the four channel magnetic tape recorder are indicated by reference numerals 8, 9, 10 and 63 and the single magnetic tape upon which the velocity and time signals are recorded by reference numeral 13. Considering channel $X$ for the purpose of explanation, electromagnetic velocity transducers 2 and 3 connected in series, through resistor 12, across the magnetic recording head 8. The magnitude of current passing through the magnetic recording head is limited to the linear range of the magnetic recording tape by means of resistor 12. Electromagnetic velocity transducer 3 is provided with terminals 20 and 23 and is affixed to its related impact surface in such a manner that upon impact terminal 23 will experience an initial positive voltage pulse of the sinusoidal voltage generated by said transducer with respect to terminal 20 causing excitation of magnetic recording head 8 whereby said positive voltage pulse indicative of the impact is recorded on magnetic tape 13. Similarly, electromagnetic velocity transducer 2 which is provided with terminals 22 and 21 is affixed to its related impact surface so that upon impact on said surface terminal 22 will experience a positive voltage pulse with respect to terminal 21. Terminal 20 is directly connected to common circuit 50 and terminal 21 is coupled to common circuit 50 through an electronic switch means 45 for termination of the magnetic recorder head current whereby said initial positive voltage pulse is cut off at a value slightly beyond the maximum value and recording during the magnetic tape advancement is prevented for a predetermined time.

The advance trigger 6 is for the purpose of generating a signal in response to the initial positive voltage pulse of the electromagnetic velocity transducer whereby electronic switching means, transistors T2, T3 and T4, are activated to connect a current source, capacitor 14, across stepping motor 15 whereby said motor is energized and advances the magnetic tape 13 one-sixteenth inch. Transistor amplifier-phase inverter $Q_6$, hereinafter referred to as $Q_6$, which produces a negative high level negative rectangular pulse at its collector in response to said initial positive voltage pulse which is a low level sinusoidal pulse has its base coupled to the positive pole, for example, of velocity transducer 3 by input circuit means consisting of series connected diode 16 and resistor 17 whereby said initial positive voltage pulse is applied to the base of $Q_6$ by such a circuit consisting of a series-connected diode and resistor, identified in the drawing by like reference characters but bearing subscripts. Resistors 17 prevents shunting of the velocity transducers to common circuit 50 by action of the amplifier-phase inverter $Q_6$ and diodes 16 prevent feedback from one input circuit to another. Capacitor 18, coupled between the base of $Q_6$ and common circuit 50, filters high frequency noise signals present at input of $Q_6$. Series connected diodes 24 and battery 25 coupled between the emitter of $Q_6$ is coupled through current limiting resistor 26 to the positive pole of potential supply 27. The negative high level rectangular output pulse of $Q_6$ is differentiated by capacitor 30 and applied through an intermediate point on a voltage divider, resistors 43 and 44 in series with capacitor 30 and ground 30, to the base of transistor switch $Q_7$ whereby switch $Q_7$ is momentarily driven into saturation by the differentiated trailing edge of the negative high level rectangular pulse whereupon the collector of switch $Q_7$ goes to a momentary near-ground potential coupling the base bias network of transistor switch T2 across the potential source 27 and causing current to flow through said network biasing transistor switch T2 on. The base bias network for transistor switch T2 consists of resistor 31 having one terminal connected to the positive pole of potential source 27 and another terminal to the base of transistor switch T2 and to the anode of diode 32 whose cathode is coupled through resistor 33 to the collector of transistor switch $Q_7$. Diode 32 also has its cathode connected to the collector of transistor switch T1 whereby switch T1 is prevented from removing the bias applied to the base of transistor switch T2. Thus it can be seen that when the collector of transistor switch $Q_7$ is grounded as aforedescribed current flows through the base biasing network of transistor switch T2 causing transistor switch T2 to be biased on. Transistor switch T2 has its emitter connected to the positive pole of potential supply 27 and its collector through voltage divider 34, series connected resistors 35 and 36, to common circuit or ground 50. The base of transistor switch T3 is coupled to an intermediate point on voltage divider 34 and the emitter thereof is coupled directly to the base of transistor switch T4 which has its emitter directly coupled to common circuit 50. The collectors of transistor switches T3 and T4 have a common junction with terminal 37 of stepping motor 15. Thus it can be seen that terminal 37 of stepping motor is held above ground until transistor switch T4 is activated.

Capacitor 14, the energy source for driving stepping motor 15, which is coupled across potential source 27 through current limiting resistor 39 and thereby energized, has one terminal connected to terminal 38 of stepping motor 15 and another terminal connected via common circuit 50 through transistor switch T4 to terminal 37 of said motor. Zener diode 40 which is connected across stepping motor 15 through current limiting resistor 39 regulates the voltage across said motor.

In order to maintain bias on the base of transistor switch T2 whereby it will remain biased on for the duration of capacitor 14 discharge through stepping motor 15 after it has been momentarily biased on by action of transistor switch $Q_7$ a biasing circuit comprising series connected resistor 42 and capacitor 41 is coupled between the base of transistor switch T2 and the common junction formed by the collectors of transistor switches T3 and T4. The capacitor terminal of this biasing circuit is connected to said common junction and resistor terminal thereof connected to the base of transistor switch T2. When transistor switch T2 is momentarily biased on it biases transistor switch T3 on which in turn biases transistor switch T4 on which then (a) couples terminal 37 of stepping motor 15 to common circuit or ground 50 resulting in the generation of a negative voltage step from +45 volts to ground at terminal 37; (b) couples capacitor 14 across stepping motor 15 which is then energized to advance magnetic tape 13; and (c) couples capacitor 41 across potential source 27 through resistors 42 and 31 whereby it is charged and maintains bias through resistor 42 on the base of transistor switch T2, keeping transistor switches T3 and T4 on long enough for capacitor 14 to discharge through the stepping motor 15.

To prevent the stepping motor circuitry from triggering in response to secondary signals caused by oscillation of the magnet of the velocity transducer after impact as well as those caused by rolling or toppling of the container during the time that the voltage across capacitor 14 is low a transistor switch T1 is provided. The base of transistor switch T1 is connected through its base bias network resistors 46 and 47, in series with zener diode 40 to terminal 38 of stepping motor 15. The emitter of transistor switch T1 is connected to the positive pole of potential supply 29 and the collector thereof to the collector of transistor switch $Q_7$ through base bias resistor 33 of transistor switch T2. Where the potential at terminal 38 drops sufficiently, during discharge of capacitor 14, zener diode 40 fires, biasing transistor switch T1 into conduction which then maintains +45 volts at its collector and shorts bias resistor 31 of transistor switch T2 whereby further triggering of switching transistor T2 by advance trigger 6 is prevented until the potential at terminal 38 has risen again to nearly +45.

Electronic switch 45 is for the purpose of rendering magnetic recording heads 8, 9 and 10 inoperative except during the limited period of the said initial positive voltage pulse. In regard thereto, transistor switches $Q_3$, $Q_4$ and $Q_5$ which are connected in parallel between the collector of transistor switch $Q_2$ and ground 50, each have an emitter connected to the collector of transistor switch $Q_2$ through current limiting resistors 52, 52a and 52b, respectively, and a collector connected to the ungrounded terminals of magnetic recording heads, 10, 9 and 8, respectively. A timing-switching means for switching transistor switches $Q_3$, $Q_4$ and $Q_5$ off and on consists of switching transistors $Q_1$ and $Q_2$ and their associated bias and RC networks and potential source 51. The base of switching transistor $Q_1$ is provided with a voltage divider comprising series connected bias resistors 55 and 53 coupled between the lower plate of capacitor 54 and ground 50 and has an intermediate point connected to the base of switching transistor $Q_1$. The top plate of capacitor 54 is connected to common junction 55a formed by the collector of transistor switch $Q_2$, resistors 52 and current limiting resistor 56 which forms with differentiating capacitor 57 a series circuit whereby the negative step voltage developed at terminal 37 of stepping motor 15 is coupled to capacitor 54 through differentiating capacitor 57 whereby the resultant negative current pulse biases the base of switching transistor $Q_1$ turning it on.

Diode 54a coupled between the lower plate of capacitor 54 provides a quick discharge path for capacitor 54. The time period for which transistor switches $Q_3$, $Q_4$ and $Q_5$ are on, short circuiting the magnetic recording heads to ground and thereby limiting the initial positive voltage pulse and preventing activation of said heads by secondary signals during the time when the magnetic tape is being advanced by stepping motor 15, is determined by the RC circuit comprising the series circuit of capacitor 34 and base bias resistors 53 and 55. Base bias network 58a for transistor switch $Q_2$ comprises series connected resistor 58 and 59 coupled between junction 59a, to which is connected the emitter of transistor switch $Q_2$ and the negative pole of potential source 51, and the collector of transistor switch $Q_1$ with the intermediate point of said network being connected to the base of transistor switch $Q_2$. The position pole of potential source 51 and the emitter of transistor switch $Q_1$ are connected through ground 50. The aforementioned negative step voltage developed at terminal 37 of stepping motor 15 is coupled through differentiating capacitor 57 and current limiting resistor 56 to capacitor 54 of RC network consisting of series-connected capacitor 54 and base resistors 52 and 53 whereby switching transistor $Q_1$ is biased on and maintained in the on condition for a period determined by the time constant at said RC network whereupon transistor switch $Q_1$ biases transistor switch $Q_2$ on for the duration of said period. When transistor switch $Q_2$ is thus biased on and its collector potential goes to approximately −7.5 volts which is applied to the base of each of the transistor switches $Q_3$, $Q_4$ and $Q_5$ causing them to go into saturation whereby the ungrounded ends of the magnetic recording heads 8, 9 and 10 are grounded preventing activation of magnetic of the magnetic heads by the electromagnetic transducers preventing the recording of signals due to said subsequent oscillatory action of the magnets of the electromagnetic velocity transducers and those signals which may be generated by said transducers due to toppling or tumbling of the container after the said initial positive voltage while the magnetic tape 13 is being advanced by stepping motor 15 as described in the foregoing.

Reference numeral 60 generally indicates circuitry which is operable once an hour to cause a magnetic recording head to record a time mark on the magnetic tape indicating the time when events have taken place. In circuitry 60 a switching means in the form of a silicon controlled rectifier, SCR, 61 is employed in parallel with the series combination of capacitor 62 and a resistor 63a which reduces the discharge time of capacitor 62. Another magnetic recording head 63 of the aforesaid four-in-line recording head is coupled across resistor 63a. The anode of SCR 61 and top plate of capacitor 62 from a junction 64 which is coupled through current limiting resistor 65, the charge path for capacitor 62, to the positive pole of potential supply 27. The cathode of SCR 61 is connected to ground 50 whereby the parallel circuit formed by SCR 61 and the series combination of capacitor 62 and resistor 63a is coupled across the potential supply 27. A voltage divider comprising series connected resistors 66 and 67 connected across potential supply 27 has an intermediate tap connected to the gate of SCR 61 whereby gate current and voltage is established for SCR 61. Capacitor 68 across resistor 67 prevents noise triggering of SCR 61. An electric watch 69 provided with contacts 70 and 71 which close once each hour and which are connected in series with said intermediate tap and resistor 66 are operable to close the voltage divider circuit whereby the SCR 61 is gated once an hour. A second base bias means is provided switching transistor T2 consisting of the series circuit comprising resistor 72, capacitor 73 and resistor 74 coupled between the positive pole of potential supply 27 and junction 64 with the junction 64a formed by capacitor 73 and resistor 72 being coupled through diode 32 to the base of switching transducer T2. The momentary closing of contacts 70 and 71 causes a gating voltage to be applied to the gate of SCR 61 causing it to go into a conductive or on state whereupon capacitor 62 discharges therethrough and the parallel combination of resistor 63a and magnetic recording head 63 whereby magnetic recording head 63 is activated to put a timing mark on magnetic tape 13. When SCR 61 is gated on a rapid drop in potential is experienced at junction 64 creating a voltage step which is differentiated by capacitor 73 and coupled thereby through diode 32 to the base of transistor switch T2 whereby transistor switch T2 is biased on resulting in the energization of stepping motor 15 with the subsequent magnetic tape 13 advancement as described in conjunction with the advance trigger 6.

We claim:

1. A velocity shock recorder adapted to be positioned in a container for measuring shock environments in terms of impact velocity or drop height to which containers are subjected to in shipment, Handling and storage comprising in combination:

a potential source coupled across said shock recorder for energizing same;

a magnetic tape recorder consisting of a multiplicity of magnetic recording heads, a single magnetic tape and a stepping motor for advancing said tape;

an electromagnetic velocity transducer affixed to an interior surface of at least one side of said container and coupled across one of said magnetic recording heads comprising a parallel circuit whereby when said side is subjected to impact a sinusoidal voltage proportional to the impact is developed by said transducer exciting said magnetic recording head whereby a signal is recorded on the magnetic tape indicative of the force of impact while the magnetic tape is stationary;

a transistor switching circuit having an input and an output, the output being coupled in series with said stepping motor and a capacitor comprising the energy source for the stepping motor;

a transistor activation circuit for activating said transistor switching circuit having an input coupled to the initial positive voltage pulse generated by said transducer and an output coupled to the input of said transistor switching circuit whereby said initial positive voltage pulse of sinusoidal form is converted to a high level rectangular pulse whereby the output of the activation circuit is operational to momentarily bias on the transistor switching circuit whereupon the output of the transistor switching circuit couples the said capacitor across the stepping motor initially activating it to advance the magnetic tape and by such action creates a negative step voltage at the junction formed by a terminal of the stepping motor and the output of the transistor switching circuit;

additional biasing means whereby said transistor switching circuit is maintained in the on state whereby the stepping motor is further energized by the capacitor to further advance the magnetic tape; and an electronic switch means responsive to said negative step voltage coupled to a parallel circuit comprising said magnetic recording head and said electromagnetic velocity transducer for limiting the sinusoidal voltage applied to said magnetic recording head to the initial positive cycle thereof whereby only said initial positive voltage pulse is applied thereto.

2. The invention in accordance with claim 1 wherein said transistor activation circuit includes a first and second transistor each having a base, collector and emitter;

said first transistor having the base thereof coupled to the electromagnetic velocity transducer whereby said initial positive voltage pulse is applied thereto, the emitter connected to the common circuit or negative pole of the potential source, and the collector connected to the positive pole of the potential source whereby the initial positive voltage pulse is converted to a high level rectangular negative pulse obtainable at the collector of said first transistor; and said second transistor having its collector in series with input bias network of the transistor switching circuit and the positive pole of the potential source, the emitter connected to the common circuit or negative pole of the potential source and the base connected to an intermediate point on a voltage divider having one end connected to the common circuit or negative pole of the potential source and another end coupled to the collector of said first transducer through a differentiating capacitor whereby the high level negative voltage pulse is differentiated and applied to base of the second transistor, the differentiated trailing edge thereof biasing the second transistor into saturation whereupon the collector of said second transistor is effectively coupled to said common circuit, placing said input bias network across said potential source thereby turning on said transistor switching circuit.

3. The invention in accordance with claim 2 wherein said electronic switch means comprises in combination:

a first transistor switch having the emitter thereof coupled to said common circuit and the collector thereof coupled to one terminal of the base bias network of a second transistor switch, another terminal of said base bias network being coupled to the emitter of said second transistor switch;

a bias source connected across said first and second transistor switches;

an RC circuit for establishing the on time for said first and second transistor switches consisting of a voltage divider having one terminal connected to said common circuit, an intermediate point connected to the base of the first transistor switch and a capacitor coupling another terminal of said voltage divider to the collector of said second transistor switch;

a third transistor switch having a base connected to the collector of said second transistor switch, the emitter connected to said common circuit and to one side of said parallel circuit, and the collector connected to another side of said parallel circuit; and a differentiating capacitor coupled between the junction by the recording terminal of the stepping motor and said output of the transistor switching circuit and the capacitor of said RC circuit whereby the negative step voltage generated at said junction is applied to the RC circuit whereby the first transistor switch is biased on for a period determined by the constants of the RC circuit, said first transistor switch thereupon biasing the second transistor switch on whereupon the collector potential thereof assumes the value of said bias source which drives the third transistor switch on, the output of which effectively shorts said parallel circuit whereby recording by the magnetic recording head is terminated for at least the duration of the magnetic tape advancement.

4. The invention in accordance with claim 3 and means for recording time marks on the magnetic tape comprising in combination:

a parallel circuit consisting of an SCR in parallel with a series connected capacitor and resistor;

a magnetic recording head connected across said resistor;

the parallel circuit connected across said potential source with the junction formed by the anode of the SCR and the capacitor being coupled through a current limiting resistor to the positive pole of said source, a voltage divider connected across said potential source having an intermediate point connected to the gate of the SCR;

a timing switch having its contacts in series with said voltage divider and adapted to close its contacts once an hour whereby said SCR is gated whereupon the current pulse due to discharge of said capacitor through the SCR energizes the magnetic recording head to record a time mark on said magnetic tape, and a voltage pulse is developed at said junction; and means coupling the last mentioned junction to said transistor switching circuit whereby said last mentioned voltage pulse is applied to the transistor switching circuit turning it on.